US00RE45970E

(19) United States
(12) Reissued Patent
Taguchi et al.

(10) Patent Number: US RE45,970 E
(45) Date of Reissued Patent: Apr. 12, 2016

(54) TONER FOR ELECTROSTATIC IMAGE DEVELOPMENT, TONER CARTRIDGE, PROCESS CARTRIDGE AND IMAGE FORMING APPARATUS

(71) Applicant: Fuji Xerox Co., Ltd., Tokyo (JP)

(72) Inventors: Tetsuya Taguchi, Kanagawa (JP); Motoko Sakai, Kanagawa (JP); Jun Igarashi, Kanagawa (JP); Masahiro Takagi, Kanagawa (JP)

(73) Assignee: FUJI XEROX CO., LTD., Tokyo (JP)

(21) Appl. No.: 13/745,389

(22) Filed: Jan. 18, 2013

Related U.S. Patent Documents

Reissue of:
(64) Patent No.: 8,227,158
Issued: Jul. 24, 2012
Appl. No.: 12/539,131
Filed: Aug. 11, 2009

(30) Foreign Application Priority Data

Mar. 25, 2009 (JP) ..... 2009-074787

(51) Int. Cl.

| | |
|---|---|
| ***G03G 9/00*** | (2006.01) |
| ***G03G 13/08*** | (2006.01) |
| ***G03G 9/08*** | (2006.01) |
| ***G03G 21/10*** | (2006.01) |
| ***G03G 9/087*** | (2006.01) |
| ***G03G 9/097*** | (2006.01) |

(52) U.S. Cl.
CPC ..... *G03G 9/0827* (2013.01); *G03G 9/08795* (2013.01); *G03G 9/09708* (2013.01); *G03G 9/09716* (2013.01); *G03G 9/09725* (2013.01); *G03G 21/10* (2013.01)

(58) Field of Classification Search
CPC ..... G03G 9/0819; G03G 9/08; G03G 9/0802; G03G 9/0808; G03G 9/0827; G03G 9/087; G03G 9/09708; G03G 9/09733
USPC ..... 430/105, 108.3, 108.7, 123.51, 123.54, 430/124.1, 137.14; 399/111, 252
See application file for complete search history.

(56) References Cited

U.S. PATENT DOCUMENTS

| | | | | |
|---|---|---|---|---|
| 4,264,697 | A | 4/1981 | Perez et al. | |
| 5,759,731 | A * | 6/1998 | Hagi et al. | 430/108.6 |
| 5,837,414 | A | 11/1998 | Kitani et al. | |
| 5,948,582 | A * | 9/1999 | Nakamura et al. | 430/110.3 |
| 6,060,202 | A * | 5/2000 | Ogawa et al. | 430/108.3 |

(Continued)

FOREIGN PATENT DOCUMENTS

| | | |
|---|---|---|
| CN | 101196702 A | 6/2008 |
| JP | A-56-11461 | 2/1981 |

(Continued)

OTHER PUBLICATIONS

Chinese Office Action issued Mar. 23, 2012 in related Chinese Patent Application No. 200910169037, with English translation.

(Continued)

*Primary Examiner* — Timothy J. Kugel
(74) *Attorney, Agent, or Firm* — Oliff PLC

(57) ABSTRACT

The invention provides a toner for electrostatic image development, containing a toner particle and external additive particles adhered to the surface of the toner particle, each of the external additive particles being constituted of plural irreversibly coalesced primary particles.

37 Claims, 1 Drawing Sheet

(56) References Cited

U.S. PATENT DOCUMENTS

| | | | | |
|---|---|---|---|---|
| 6,635,398 | B1 * | 10/2003 | Komoto et al. | 430/108.23 |
| 6,818,369 | B2 * | 11/2004 | Sugiura et al. | 430/108.1 |
| 2001/0053492 | A1 * | 12/2001 | Suwabe et al. | 430/110.3 |
| 2003/0063922 | A1 * | 4/2003 | Furumizu | 399/149 |
| 2004/0067189 | A1 * | 4/2004 | Sugiura et al. | 423/335 |
| 2006/0150527 | A1 * | 7/2006 | Ohara et al. | 51/308 |
| 2008/0131804 | A1 | 6/2008 | Kamiyoshi et al. | |

FOREIGN PATENT DOCUMENTS

| | | |
|---|---|---|
| JP | A-62-39879 | 2/1987 |
| JP | A-62-246073 | 10/1987 |
| JP | A-2-289859 | 11/1990 |
| JP | A-7-28276 | 1/1995 |
| JP | A-9-319134 | 12/1997 |
| JP | A-10-010770 | 1/1998 |
| JP | A-2000-221726 | 8/2000 |
| JP | A-2005-234300 | 9/2005 |

OTHER PUBLICATIONS

Jan. 19, 2013 Korean Office Action issued in Korean Patent Application No. 10-2009-0083893 (with English translation).

* cited by examiner

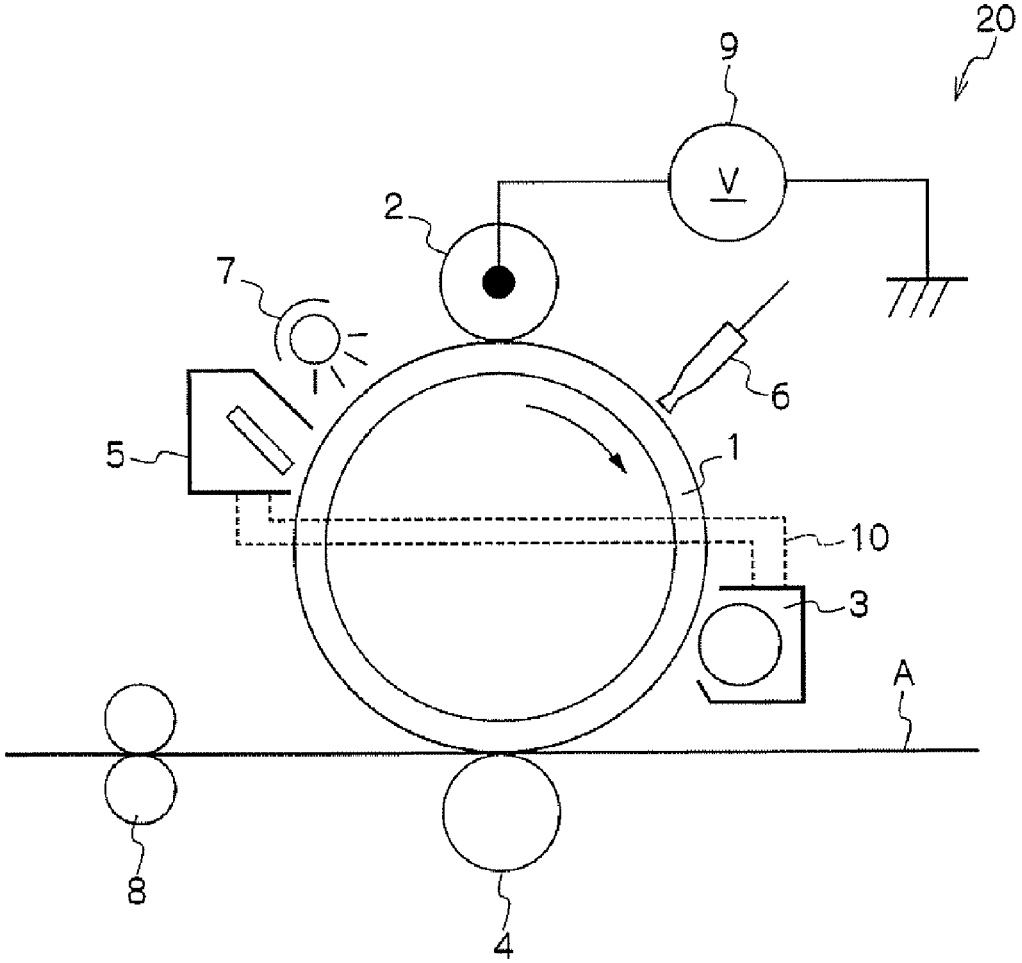
20
9
V
2
7
6
5
1
10
3
A
8
4

TONER FOR ELECTROSTATIC IMAGE DEVELOPMENT, TONER CARTRIDGE, PROCESS CARTRIDGE AND IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is based on and claims priority under 35 USC 119 from Japanese Patent Application No. 2009-074787 filed on Mar. 25, 2009.

BACKGROUND

1. Technical Field

The present invention relates to a toner for electrostatic image development, a toner cartridge, a process cartridge and an image forming apparatus.

2. Related Art

The image forming apparatus in the so-called xerographic system is provided with an image holding member (hereinafter referred to sometimes as "photoreceptor"), a charging device, an exposure device, a developing device, a transfer device and a fixing device and forms an image by an electrophotographic system using these devices. In recent years, an image forming apparatus in the xerographic system attains a higher speed, high image qualities and a long lifetime by technical development of the member and the system.

For achieving high image qualities, it is necessary that a fine latent image formed in an optical system is used to faithfully produce an image, and for improvement of faithful reproducibility of a fine latent image, it is attempted to reduce the diameter of a toner. From the viewpoint of higher speed and low energy consumption, an electrophotographic toner capable of fixing in a shorter time and an electrophotographic toner capable of fixing at lower temperature, that is, an electrophotographic toner capable of fixing with low fixing energy is demanded. To lower the fixing energy of the toner, a toner resin (binder resin) having a relatively low glass transition temperature is used or a plasticizer is added, and it is desired that while aggregation of toner particles is inhibited, the fixing energy is reduced.

Generally when the toner undergoes stress in a developing machine etc., external additives adhered to the surface of the toner are released or buried, thus increasing the area where the external additives are not present on the surface of a toner particle, and as a result, the non-electrostatic adhesion of the toner tends to increase. This tendency is more significant in toners and toner materials fixable with low energy, and there is demand for effectively preventing the clogging of a carrier device and a recovery device with toners, caused by aggregation of toner particles, adhesion of toner particles to the devices, and reduction in the fluidity of a toner particle powder layer.

SUMMARY

According to an aspect of the present invention, there is provided a toner for electrostatic image development, comprising a toner particle and external additive particles adhered to the surface of the toner particle, each of the external additive particles being constituted of a plurality of irreversibly coalesced primary particles.

BRIEF DESCRIPTION OF THE DRAWING

Exemplary embodiments of the invention will be described in detail based on the following figures, wherein:

FIG. 1 is a skeleton framework showing one example of the image forming apparatus of the invention.

DETAILED DESCRIPTION

Hereinafter, the present invention will be described in detail.

<Toner for Electrostatic Image Development>

In the toner for electrostatic image development in this exemplary embodiment (also referred to hereinafter as simply "toner"), the toner particle contains one or more binder resins and may if necessary contain other additives such as a coloring agent and a releasing agent. The toner particle is characterized by containing external additive particles which are adhered to the surface of the toner particle (hereinafter referred to sometimes as the specific external additive particles), and the external additive particles are constituted of plural primary particles being irreversibly coalesced.

<External Additive Particle Constituted of Plural Irreversibly Coalesced Primary Particles>

In this exemplary embodiment, an amorphous particle obtained by coalescing plural irreversibly coalesced primary particles is used as the external additive. Usually, amorphous particles obtained by milling etc., as compared with spherical particles having a shape factor SF of around 100, are effectively prevented from being buried in toner particles, but may, due to their sharp shapes, cause flaws in an image forming member or cause damage to a coating layer if present on the toner particle. In this exemplary embodiment, however, the specific external additive particles formed by coalescing primary particles together are amorphous particles having an uneven surface and being free of sharp angles.

The specific external additive particle in this exemplary embodiment is an external additive particle containing plural irreversibly coalesced primary particles. This amorphous particle is an aggregate having an uneven surface, and preferably has a shape with shape factor SF2 in the range of from 110 or about 110 to 160 or about 160 determined by observation with a scanning electron microscope or a transmission electron microscope and represented by the following formula (1):

$$[(\text{Particle perimeter}\hat{}2)/(\text{particle projected area}*4*\pi)]\times 100 \quad (1)$$

In formula (1), ^2 indicates square, and * indicates multiplication.

The shape factor SF2 of the primary particles is determined as follows. The specific external additive particles are observed with an electron microscope (for example, an S-4100 manufactured by Hitachi, Ltd.) and photographed, and the image thereof is entered into an image analyzer (for example, a LUZEX III manufactured by Nireko Corporation), and from the particle perimeters and projected areas of 300 or more specific external additive particles, the SF2 of the individual particles is determined according to the formula (1) above.

The specific external additive particles having a shape factor SF2 in the range of from 110 or about 110 to 160 or about 160 are specifically those particles having shapes such as follows.

Particles having an uneven surface, like a potato or raspberry

Particles having plural particles coalesced therein, like a daruma doll or tumble doll, or a peanut Particles having protrusions, like a confeito (which is a Japanese confection having horned protrusions on the surface of a spherical shape).

Warped or deformed particles like boiled rice grains without germs and broad beans.

In the specific external additive particle in this exemplary embodiment, plural primary particles are aggregated and coalesced in an irreversible state to form a particle shape having many concavoconvex structures on its surface. The specific external additive particle has concavoconvex structures on the surface, and thus, even when it adheres to the surface of the toner particle and receives strong longitudinal pressure, it has greater resistance to penetrating into the toner particle than ordinary spherical particles, and is thus less likely to be buried in the toner particle. The point of contact of ordinary spherical particles with a toner particle almost becomes a single point, and thus, the pressure applied to the point of contact is concentrated thereto to make it easy for the ordinary spherical particles to be buried in the toner particle. However, the specific external additive particle in this exemplary embodiment has concavoconvex structures on the surface thereof, so that there are plural points of contact with the toner particle, or the contact area is increased, and so it is estimated that the pressure applied to one point of contact is dispersed to make the external additive particles less likely to be buried in the toner particle. Meanwhile, since the specific external additive particle in this exemplary embodiment has plural points of contact with, or an increased contact area with, the toner particle, it has stronger adhesion to the toner particle than the ordinary spherical particle, and therefore, it is estimated that the specific external additive particle is less likely to be released, and the members and a recording medium in an image recording apparatus are prevented from being contaminated with released external additives.

Even when the toner in the exemplary embodiment is used in an image forming apparatus having a cleaning blade and a toner recovery device, the particle into which plural primary particles are coalesced has many concavoconvex structures on the surface thereof so that even upon application of stress in any direction by the cleaning blade, the specific external additive particles are prevented from being buried in the toner particle, and the fluidity of the recovered toner can be prevented from decreasing, and thus, it is estimated that adhesion of the toner to the apparatus and clogging of a toner carrier path with the recovered toner hardly occur. Thus, the change in characteristics of the toner is minimized, and so the toner in the exemplary embodiment is estimated to be applicable to an image forming apparatus having a toner recovery device and to an image forming apparatus having a device for reutilizing the recovered toner.

Conventional external additive particles such as silica particles, when added to toner particles and stirred under specific conditions, will sometimes form aggregates on the surfaces of the toner particles, but such aggregates are those of temporarily electrostatically or non-electrostatically aggregated primary particles. Such aggregates, when undergoing stress with a cleaning blade or by stirring in a developing device for example, will be broken and dispersed in the state of primary particles. Because the external additive thus dispersed in the state of primary particles is easily buried in the toner particles, in the case where the aggregate is broken by stress in this manner, that is, in reversibly coalesced and aggregated particles, the effect as shown in the exemplary embodiment is hardly exhibited.

It is also conceivable that by increasing the diameter of external additive particles, the external additive particles are prevented from being buried in toner particles. A certain effect of preventing external additive particles from being buried in toner particles can be attained by increasing the diameter of the external additive particles, but the additive particles, when subjected to pressure with a cleaning blade or the like or stirred for a long time in a developing device, hardly exhibit sufficient effects. Moreover, when the external additive particles simply having an increased diameter are used, they are easily released from toner particles, which may result in pollution of members therewith in the image forming apparatus.

By the phrase "primary particles are irreversibly coalesced" in this exemplary embodiment, it is meant that even when the specific external additive particles undergo stress, for example, when the toner in this exemplary embodiment is stirred in a developing device or when the toner is scraped off with a cleaning blade and recovered in a recovery device, the specific external additive particles maintain their original shapes at the time they were coalesced without being redivided into primary particles.

Hereinafter, one example of the method of confirming that the specific external additive particles maintain their original shapes at the time they coalesce without being redivided into primary particles will be described.

A driving unit of an image forming apparatus Apeos Port-II C7500 manufactured by Fuji Xerox Co., Ltd. is modified such that its developing device can be solely driven. By successively outputting blank papers, the developing device is driven, and the developer in the apparatus undergoes stress by stirring.

In this manner, the developing device is driven for 2 hours, and then the developer is recovered from the developing device, then observed for its toner under an electron microscope (for example, a S-4100 manufactured by Hitachi, Ltd.) and compared with the developer without undergoing history of driving in the developing device. Items observed with the electron microscope include changes in particle diameter and in particle shape. The rate of change and the degree of redispersion of the specific external additive particles, as determined under the electron microscope, are preferably 30% by number, respectively.

In this exemplary embodiment, the external additive particle into which plural primary particles have been coalesced preferably has a number-average long axis diameter of 0.06 μm to 1 μm, more preferably a number-average long axis diameter of 0.1 μm to 0.8 μm. When the number-average long axis diameter of the specific external additive particles is in this range, the external additive particles can improve prevention thereof from being buried in toner particles and are excellent in adhesion to toner particles to prevent them from releasing from the toner particles.

In this exemplary embodiment, the number-average particle diameter of the specific external additive particles is determined as follows.

The external additive particles are observed with a scanning electron microscope (for example, a S-4100 manufactured by Hitachi, Ltd.) and photographed, and the image thereof is entered into an image analyzer (for example, a LUZEXIII manufactured by Nireko Corporation.), and the circle-equivalent diameters, long axis diameters and short axis diameters of 300 or more external additive particles are measured and then averaged up thereby determining their number-average particle diameter, long axis diameter and short axis diameter, respectively.

Now, the specific external additive particles, along with the method for producing the same, will be described in detail.

In the specific external additive particle in this exemplary embodiment, plural irreversibly coalesced primary particles, wherein the number-average particle diameter D1 of the primary particles constituting the external additive particles and the number-average long axis diameter D2 of the specific external additive particles satisfy the relationship represented by formula (2) below. That is, the ratio of the number-average long axis diameter of the primary particles to the number-average long axis diameter of the objective specific external additive particles is preferably 1/15 to 2/3, from the viewpoint of the effect.

$$1.5 \leq D2/D1 \leq 15 \quad (2)$$

From the above viewpoint, the number-average long axis diameter of the primary particles is preferably in the range of from 0.02 μm or about 0.02 μm to 0.50 μm or about 0.05 μm, more preferably in the range of from 0.03 μm or about 0.03 μm to 0.3 μm or about 0.3 μm.

The number-average particle diameter of the primary particles is determined as follows. The primary particles are observed with an electron microscope (for example, a S-4100 manufactured by Hitachi, Ltd.) and photographed, and the image thereof is entered into an image analyzer (for example, a LUZEXIII manufactured by Nireko Corporation), and the circle-equivalent diameters of 300 or more primary particles are measured to determine the number-average value. Alternatively, the specific external additive particles are directly observed with an electron microscope, and the shape of the specific external additive particles is photographed, then the unevenness of the surface and the joint surfaces among the primary particles are observed, and from the whole shape etc., the particle diameter of the primary particles are measured. In this case, the shape and diameter of the primary particles before coalesce are estimated by examining the observable portion of the primary particles and can be determined in the same manner as described above.

The specific external additive particles in this exemplary embodiment are preferably free of a sharp shape as described above, and from this viewpoint, the primary particles constituting the external additive particle are preferably spherical or nearly spherical. Specifically, the primary particles constituting the specific external additive particles have shape factor (SF1) of preferably 100 to 130, more preferably 100 to 125. When the spherical primary particles are coalesced together, their coalesced particles have depressions and protrusions and being free of sharp angles.

The shape factor (SF1) of the primary particles is determined as follows. The primary particles are observed with an electron microscope (for example, S-4100 manufactured by Hitachi, Ltd.) and photographed, and their pictures is taken into an image analyzer (for example, a LUZEXIII manufactured by Nireko Corporation.), and from the maximum length and area of 300 or more primary particles, the shape factor of the individual primary particles is determined according to the following formula (3).

$$SF1=[(ML^2/A)\times(\pi/4)]\times 100 \quad (3)$$

In formula (3), ML indicates the absolute maximum length of the [toner] *primary* particles; *and* A indicates the projected area of the [toner] *primary* particles[; and n represents the circular constant]. When the primary particle is truly spherical, SF1=100, and SF1 is minimum.

As long as the primary particles constituting the specific external additive particles have the shape described above, the material constituting the primary particles is not particularly limited, and materials usable usually in toner external additives can be used without limitation.

When the primary particles are organic particles, the organic particles include, for example, fluorine resin powder of polyvinylidene fluoride or polytetrafluoroethylene, an aliphatic acid metal salt such as zinc stearate or calcium stearate, and particles of polystyrene, polymethyl methacrylate, acrylic resin, melamine resin, nylon, or urea resin.

When the primary particles are inorganic particles, the inorganic particles include, for example, particles of silica, alumina, titanium oxide, barium titanate, magnesium titanate, calcium titanate, strontium titanate, zinc oxide, silica sand, clay, mica, wollastonite, diatomaceous earth, cerium chloride, red oxide, chrome oxide, cerium oxide, antimony trioxide, magnesium oxide, zirconium oxide, silicon carbide, or silicon nitride.

Among these materials, resin particles of vinyl polymerized resin or crosslinked resin and metal oxide particles of silica, titania or cerium oxide are preferable form less influence on image qualities.

The method of coalescing primary particles irreversibly is not particularly limited.

Specific examples include, for example, a method wherein primary particle (organic particle) dispersion obtained by dispersion polymerization, emulsion polymerization or suspension polymerization is heated to melt the surfaces of the primary particles thereby coalescing plural the particles, a method wherein an organic solvent or the like is added to a primary organic particle dispersion to melt the surfaces of the primary organic particles thereby coalescing plural the particles, a method wherein primary particles are aggregated and coalesced together by changing the pH of its dispersion or by adding an aggregating agent, a salt etc., a method wherein plural primary particles are adhered to one another with a binder resin, a method wherein primary particles are coalesced together by solution crosslinking during drying of a dispersion of the primary particles or a dispersion of aggregates of the primary particles, and a combination of these methods. A seed emulsion polymerization method wherein monomers are added dropwise to a dispersion of primary particles or a dispersion of aggregates of primary particles may also be used, and in this case, crosslinking monomers are particularly preferably used.

Alternatively, a method for producing silica particles may be regulated to prepare aggregates of plural particles (for example, a method for producing silica by high-temperature flame hydrolysis wherein the feed rate of raw materials and the burning temperature are regulated) or a method wherein primary particles are prepared by a sol-gel method, then aggregated by salting-out and dried, may be selected depending on the object.

Particularly, a method of irreversibly coalescing primary organic particles is preferably a method wherein when primary particles are organic particles, plural primary particles are aggregated by salting-out or coagulation and then aggregated faces among the primary particles are coalesced together by heating, an organic solvent or polymerization reaction, a method wherein when primary particles are inorganic particles, primary particles are prepared under such conditions as to cause coalesce from the start of preparation thereof, and a method wherein a dispersion of primary inorganic particles are subjected to salting-out or coagulation thereby forming aggregates of the inorganic particles in the dispersion, followed by coalescing the primary inorganic particles by drying and heating or by using a binder resin or coupling surface treatment.

The specific external additive particles obtained by coalescing from 2 or about 2 to 300 or about 300, more preferably from 2 or about 2 to 100 or about 100, primary particles on a projected area are preferable from the viewpoint of the diameters of the resulting particle and of forming depressions and protrusions on its surfaces. When the number of primary particles constituting the specific external additive particle is 1 or less, the coalesced particle cannot be constituted. When the number of primary particles constituting the specific external additive particle is too large, effective depressions and protrusions are hardly formed on the specific external additive particle.

The number of primary particles constituting the specific external additive particle is measured using an electron microscope photograph used previously in measuring the size.

The shape factor of the specific external additive particles, as determined from the following formula (1), is preferably in the range of 110 to 160. When the shape factor is too small, there are few effective depressions and protrusions on the specific external additive particle, thus reducing the efficiency of exhibition of functions. When the shape factor is too large, the strength of the resulting coalesced particles is easily reduced so that the specific external additive particles are easily broken and deformed.

$$[(\text{Particle perimeter}^2)/(\text{particle projected area}*4*\pi)]\times 100 \quad (1)$$

In formula (1), ^2 indicates square, and * indicates multiplication.

In the specific external additive particle, the number-average particle diameter D1 of the primary particles constituting the specific external additive particles and the number-average long axis diameter D2 of the external additive particles satisfy more preferably the relationship represented by formula (2) below. When this numerical value is the range below, effective depressions and protrusions are formed on the surfaced of the specific external additive particle, thus improving the efficiency of exhibition of functions $$1.5 \leq D2/D1 \leq 15 \quad (2)$$

The number of primary particles constituting the specific external additive particle on a projection plane is primarily measured from the unevenness of the surface, the coalesced surface between the primary particles, the whole shape etc. by observing and photographing the specific external additive particles under an electron microscope. In this measurement method, the shape and diameter of the primary particles before coalesce are estimated by examining the observable portion of the primary particles, and the number of primary particles constituting the specific external additive particle on a projection plane can be determined. The number of primary particles constituting the specific external additive particle can be regulated for example by the concentration and stirring rate of the primary particles used to prepare the specific external additive particles by the method described above.

The specific external additive particles thus obtained are mixed with toner particles under the same conditions as in a step of adding known external additives and adhered to the surfaces of toner particles described in detail below.

(Toner Particles)

The toner particles in this exemplary embodiment contain at least one binder resin and may if necessary contain a coloring agent, a releasing agent and other internal additives.

Hereinafter, the components constituting the toner particles in this exemplary embodiment will be described in order.

(1. Binder Resin)

The binder resin is not particularly limited, and examples thereof include homopolymers composed of monomers such as styrenes such as styrene, p-chlorostyrene, and α-methylstyrene; esters having a vinyl group such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; vinylnitriles such as acrylonitrile and methacrylonitrile; vinylethers such as vinyl methyl ether, and vinyl isobutyl ether; vinyl ketones such as vinyl methyl ketone, vinyl ethyl ketone, and vinyl isopropenyl ketone; and polyolefines such as ethylene, propylene, and butadiene, and copolymers obtained by combining two or more of these monomers, as well as mixtures thereof. Further examples include non-vinyl condensed resins such as epoxy resin, polyester resin, polyurethane resin, polyamide resin, cellulose resin, polyether resin, mixtures of these resins with the vinyl resins, and graft polymers obtained by polymerizing vinyl monomers in the presence of these resins.

The styrene resin, (meth)acrylic resin, styrene-(meth) acrylic copolymer resin can be synthesized for example by selecting monomers from the following styrene monomers and (meth)acrylic monomers singly or a combination of monomers depending on the object and polymerizing the monomers by a method known in the art.

The styrene monomers include, for example, styrene; alkyl-substituted styrenes having an alkyl chain, such as α-methylstyrene, vinylnaphthalene, 2-methylstyrene, 3-methylstyrene, 4-methylstyrene, 2-ethylstyrene, 3-ethylstyrene, and 4-ethylstyrene; halogen-substituted styrenes such as 2-chlorostyrene, 3-chlorostyrene, and 4-chlorostyrene; fluorine-substituted styrenes such as 4-fluorostyrene, and 2,5-difluorostyrene; and the like. The (meth)acrylic acid monomers include, for example, (meth)acrylic acid, n-methyl (meth)acrylate, n-ethyl(meth)acrylate, n-propyl(meth)acrylate, n-butyl(meth)acrylate, n-pentyl(meth)acrylate, n-hexyl (meth)acrylate, n-heptyl(meth)acrylate, n-octyl (meth)acrylate, n-decyl(meth)acrylate, n-dodecyl(meth)acrylate, n-lauryl(meth)acrylate, n-tetradecyl(meth)acrylate, n-hexadecyl (meth)acrylate, n-octadecyl(meth)acrylate, isopropyl (meth) acrylate, isobutyl(meth)acrylate, t-butyl(meth)acrylate, isopentyl (meth)acrylate, amyl(meth)acrylate, neopentyl (meth)acrylate, isohexyl(meth)acrylate, isoheptyl (meth) acrylate, isooctyl(meth)acrylate, 2-ethylhexyl(meth) acrylate, phenyl (meth)acrylate, biphenyl(meth)acrylate, diphenylethyl(meth)acrylate, t-butylphenyl (meth)acrylate, terphenyl(meth)acrylate, cyclohexyl(meth)acrylate, t-butylcyclohexyl (meth)acrylate, dimethylaminoethyl(meth)acrylate, diethylaminoethyl(meth)acrylate, methoxyethyl(meth) acrylate, 2-hydroxyethyl(meth)acrylate, β-carboxyethyl (meth)acrylate, (meth)acrylonitrile, (meth)acrylamide, and the like. The styrene resin can be prepared from any combination of these monomers properly selected, according to a known method.

The polyester resin is synthesized for example by selecting a suitable combination of dicarboxylic acid and diol components from those described below and subjecting them to a known method such as an ester exchange method or a polycondensation method. The divalent carboxylic acid component includes, for example, terephthalic acid, isophthalic acid, cyclohexanedicarboxylic acid, naphthalenedicarboxylic acid such as naphthalene-2,6-dicarboxylic acid or naphthalene-2,7-dicarboxylic acid, and biphenyldicarboxylic acid. Further examples include dibasic acids such as succinic acid, glutaric acid, adipic acid, suberic acid, azelaic acid, sebacid acid, phthalic acid, malonic acid and mesaconic acid, their anhydrides and lower alkyl esters, and aliphatic unsaturated dicarboxylic acids such as maleic acid, fumaric acid, itaconic acid and citroconic acid. Trivalent or higher-valent carboxylic acids such as 1,2,4-benzene tricarboxylic acid, 1,2,5-benzene tricarboxylic acid, 1,2,4-naphthalene tricarboxylic acid, their anhydrides and lower alkyl esters may also be used. For the purpose of regulation of acid value and hydroxyl value, monovalent acids such as acetic acid and benzoic acid may also be used if necessary.

The diol component include ethylene glycol, propylene glycol, neopentyl glycol, cyclohexane dimethanol, ethylene (or propylene) oxide adduct of bisphenol A, and trimethylene oxide adduct of bisphenol A. Other examples include bisphenol A, hydrogenated bisphenol A, 1,4-cyclohexane diol, 1,4-cyclohexane dimethanol, diethylene glycol, dipropylene glycol, 1,3-butane diol, 1,4-butane diol, 1,5-pentane diol, 1,6-hexane diol, neopentyl glycol, etc. Trivalent or higher-valent alcohols such as glycerin, trimethylol ethane, trimethylol propane, pentaerythritol, etc. may also be used in a very small amount. They may be used either alone or in combination of two or more thereof. A monovalent alcohol such as cyclohexanol or benzyl alcohol may be also used.

When styrene resin, (meth)acrylic resin and a copolymer resin thereof is used as the binder resin, it is preferable that the weight-average molecular weight Mw is 10,000 to 100,000, and the number-average molecular weight Mn is 1,000 to 30,000. On the other hand, when polyester resin is used as the binder resin, it is preferable that the weight-average molecular weight Mw is 4,000 to 50,000, and the number-average molecular weight Mn is 1,000 to 10,000

A crystalline resin can also be used in the toner particles, and the crystalline resin is used preferably in the range of 2 to 30% by mass, more preferably 5 to 20% by mass, based on the solid content.

When the content of the crystalline resin is in the above range, excellent fixability can be attained.

The toner in this exemplary embodiment contains the specific external additive particles described above, so that even if toner particles are excellent in fixability with low energy, for example those having a glass transition temperature of 80° C. or less, particularly those having a glass transition temperature of from 35° C. or about 35° C. to 75° C. or about 75° C. are used, the external additive can be prevented from being buried in the toner particles.

The glass transition temperature (Tg) of the toner particles can be determined, for example, from a DSC spectrum obtained by using a differential scanning calorimeter (for example, DSC3110 manufactured by Mac Science Company Ltd., or thermal analysis system 001) under the condition of a temperature increasing rate of 10° C./minute from 0° C. to 150° C.

(2. Releasing Agent)

The toner particles in this exemplary embodiment may contain a releasing agent.

The releasing agent used in the toner particles in this exemplary embodiment is preferably a substance having the main maximum peak within the range of 50 to 140° C. as measured according to ASTM D3418-8.

For measuring the main maximum peak value, DSC-7 (manufactured by Perkin Elmer Inc.) may be used. For the temperature correction of the detecting section in this apparatus, the melting points of indium and zinc are utilized, while the heat of coalesce in indium is used for the correction for heat quantity. A pan made of aluminum is used for samples, while an empty pan is used as a control; and the measurement is conducted at a temperature increasing rate of 10° C./min.

Specific examples of the releasing agent include low-molecular weight polyolefins such as polyethylene, polypropylene, and polybutene; silicones having a softening point under heat; fatty acid amides such as oleic acid amide, erucic acid amide, ricinolic acid amide, and stearic acid amide; vegetable waxes such as carnauba wax, rice wax, candelilla wax, Japan wax, and jojoba oil; animal waxes such as beeswax; mineral or petroleum waxes such as montan wax, ozokerite, ceresin, paraffin wax, microcrystalline wax, and Fischer Tropsch wax; and modifications thereof.

(3. Colorant)

The toner particles in this exemplary embodiment may contain a colorant.

The colorant is not particularly limited as long as it is a known colorant. Specific examples thereof include a carbon black such as furnace black, channel black, acetylene black and thermal black; an inorganic pigment such as red iron oxide, iron blue and titanium oxide; an azo pigment such as Fast Yellow, Disazo Yellow, pyrazolone red, chelate red, Brilliant Carmine and Para Brown; a phthalocyanine pigment such as copper phthalocyanine and nonmetal phthalocyanine; a condensation polycyclic pigment such as flavanthrone yellow, dibromoanthrone orange, perylene red, Quinacridone Red and Dioxazine Violet.

Specific examples of the colorant include pigments such as chrome yellow, hansa yellow, benzidine yellow, threne yellow, quinoline yellow, permanent orange GTR, pyrazolone orange, vulkan orange, watchung red, permanent red, Dupont oil red, lithol red, rhodamine B lake, lake red C, rose bengal, aniline blue, ultramarine blue, calco oil blue, methylene blue chloride, phthalocyanine blue, phthalocyanine green, malachite green oxalate, C.I. pigment red 48:1, C.I. pigment red 122, C.I. pigment red 57:1, C.I. Pigment Yellow 12, C.I. pigment yellow 97, C.I. pigment yellow 17, C.I. pigment blue 15:1, and C.I. pigment blue 15:3, and these colorants may be used alone or in combination of two or more thereof.

The content of the above-described colorant in the toner particles is preferably in the range of 1 to 30 parts by mass relative to 100 parts by mass of the binder resin. Further, it is also effective to use a surface-treated colorant or a pigment dispersant as needed. By selecting the kind of the colorant, a yellow toner, magenta toner, cyan toner, black toner or the like is obtained.

(4. Other Additive Components)

Other internal additives may be known materials such as a magnetic material, a charging regulating agent, inorganic powder etc.

The volume-average particle diameter of the toner particles is preferably 3 μm to 10 μm, more preferably 5 μm to 8 μm.

The volume-average particle diameter of the toner particles is determined as follows. A cumulative volume distribution curve and a cumulative number distribution curve are drawn from the side of the smaller particle size, respectively, for each particle size range (channel) as a result of division of the particle size distribution measured by using a measuring instrument, for example, a Coulter Multisizer II (manufactured by Beckmann Coulter, Inc.) or the like, and the particle diameter providing 50% cumulative is defined as volume $D_{50v}$ and number $D_{50p}$. Unless otherwise specified, the volume-average diameter of the toner mother particles is expressed in terms of volume $D_{50v}$ that is the particle diameter providing 50% cumulative as determined by the method described above.

In the measurement, 0.5 to 50 mg of a sample to be measured is added to 2 mL of a 5% solution of a surfactant, preferably sodium alkylbenzenesulfonate, as a dispersing agent in water. The resulting measurement sample is added to 100 to 150 mL of an electrolytic solution. The electrolytic solution is generally an aqueous solution of about 1% NaCl prepared by using sodium chloride of a first grade, for example, ISOTON-II (manufactured by Beckmann Coulter, Inc.). Alternatively, an aqueous solution of potassium chloride (KCl) may also be used as the electrolytic solution. This electrolytic solution containing the measurement sample suspended therein is subjected to dispersing treatment with an ultrasonic disperser for about 1 minute, and the particle diameter distribution of the particles is measured. The number of the particles to be measured is 50,000.

The method for producing toner particles is not particularly limited, and includes a kneading milling method and a wet granulation method. The wet granulation method includes, for example, a known melting suspension method, an emulsification aggregation/coalesce method, a dissolution suspension method, etc.

<Adhesion of External Additives>

After the toner particles are produced in this manner, the specific external additives and other known external additives used if necessary (hereinafter referred to sometimes as "other external additives") are adhered to the surfaces of toner particles, thereby producing the toner in this exemplary embodiment.

The method of adhering the specific external additive particles and other external additives to toner particles includes a method of adhesion by applying shear strength in a dry state or in a slurry state. After the specific external additive particles are adhered to toner particles, other external additives may be adhered to the toner particles.

By so doing, the specific external additive particles which are free of a sharp angle and have depressions and protrusions are not buried in toner particles even upon application of stress, are contacted at many points with the toner particle and thus prevented from being released from the toner particle, and remain on the surface of the toner particle even under severe conditions such as long-term stirring in a developing device, recovery from removal from a cleaning device and movement in a recovery device, thereby preventing deterioration in fluidity, aggregation of toner particles and adhesion of toner particles to an apparatus, which would result in preventing clogging of a carrier path with toner particles or abnormal noises attributable to aggregates.

Moreover, the specific external particles present on the surface of a toner particle, when used in combination with other external additives, function as spacers to prevent the other external additives from being buried in the toner particle, which would result in suppressing change in toner characteristics.

The amount of the specific external additive particles adhered to toner particles is determined for example by observing the developer under a scanning electron microscope. Under a scanning electron microscope having magnifying power regulated to enable confirmation of the specific external additive particles, 300 toner particles are confirmed, and the specific external additive particles adhered to the toners are counted to determine the average number of the particles adhered to one tone particle. Because it is estimated that the specific external additive particles are also adhered similarly to the backside of the toner particle not observable with a scanning electron microscope, this average number of the particles is doubled to determine the number of the specific external additive particles adhered to the whole surface of the toner particle.

The average number of the specific external additive particles adhered to the surface of one toner particle is preferably from 5 or about 5 to 300 or about 300.

The toner in this exemplary embodiment may be used in combination with other external additives in addition to the specific external additive particles. The simultaneously used other external additives are not particularly limited and may be any additives known in the art.

<Electrostatic Image Developer>

The electrostatic image developer of the invention contains the toner for electrostatic image development in the exemplary embodiment described above.

The developer containing the toner for electrostatic image development in the exemplary embodiment may be compounded with other components if necessary.

Specifically, when the toner in the exemplary embodiment is used alone, the developer is prepared as one-component electrostatic image developer, and when the toner is used in combination with a carrier, the developer is prepared as two-component electrostatic image developer. The density of the toner in the two-component developer is preferably in the range of 1 to 20% by mass.

The carrier is not particularly limited, and carriers known per se can be mentioned, and for example known carriers such as carriers having a core material coated with a resin layer (resin-coated carrier) described in JP-A No. 62-39879 and JP-A No. 56-11461 can be used.

<Image Forming Apparatus, Toner Cartridge>

The image forming apparatus in this exemplary embodiment includes at least a image holding member, a charging unit that charges the surface of the image holding member, an electrostatic latent image forming unit that forms an electrostatic latent image on the surface of the charged image holding member, a development unit that develops the electrostatic latent image with the developer, thereby forming a toner image, a transfer unit that transfers the toner image formed on the image holding member to the surface of a recording medium, a fixing unit that fixes the toner image transferred on the surface of the recording medium, and a toner erasing unit that erases the toner remaining on the surface of the image holding member after transfer, wherein the developer contains the toner in the exemplary embodiment.

The image forming apparatus in the exemplary embodiment may further include a residual toner recovering/feeding unit that recovers the residual toner eliminated by the toner eliminating unit and feeds the recovered residual toner to the development unit.

Hereinafter, the image forming apparatus in this exemplary embodiment will be described with reference to the drawing. This exemplary embodiment will be described with reference to the image forming apparatus having a residual toner recovering/feeding unit, but is not limited thereto. The members having substantially the same function are shown with the same reference numeral throughout the drawings, and an overlapping description may be omitted.

FIG. 1 is a skeleton framework showing one example of the image forming apparatus of the present invention. The image forming apparatus 20 in FIG. 1 includes an electrophotographic photoreceptor (latent image holding member) 1, a contact-type charging device 2 that charges the electrophotographic photoreceptor 1, a power source 9 that applies voltage to the contact-type charging device 2, an exposing device 6 that exposes the charged electrophotographic photoreceptor 1 to light to form a latent image, a developing device (developing unit) 3 that develops the formed latent image with a developer containing a toner to form a toner image, a transfer device (transferring unit) 4 that transfers the toner image formed by the developing device 3 onto a recording medium A, a cleaning device (cleaning unit) 5 that removes the toner remaining on the electrophotographic photoreceptor 1 after transfer, an eraser 7 that erases a voltage remaining on the surface of the electrophotographic photoreceptor 1, a fixing device 8 that fixes the toner image transferred onto the recording medium A by heat and/or pressure, and a toner returning pipe (recycling unit) 10 that returns the residual toner removed as recycled toner by the cleaning device 5 to the developing device 3.

The developer used herein is a developer the toner in this exemplary embodiment.

First, the steps in image formation in this image forming apparatus will be briefly described.

In the charging step, the contact-type charging device 2 is used as a charging unit, thereby charging the electrophotographic photoreceptor 1, wherein the charging unit includes a non-contact charging device such as a corotron or scorotron and a contact-type charging device for charging the electrophotographic photoreceptor by applying voltage to an electroconductive member (volume resistivity: $10^{11}$ Ωcm or less, the member shown below also has the same volume resistivity) contacted with the surface of the electrophotographic photoreceptor, and the charging device may be in any system.

In the charging device in the contact-type charging system, the shape of the electroconductive member is not limited and may be brush, blade, pin electrode, or roll shaped.

In the latent image-forming step, a latent image is formed on the surface of the charged electrophotographic photoreceptor 1 with the exposing device 6. As the exposing device 6, a laser optical system or an LED array for example is used.

In the development step, the latent image formed on the surface of the electrophotographic photoreceptor 1 is developed with a developer containing the toner in the exemplary embodiment to form a toner image. For example, a developer holding member having a developer layer formed thereon is contacted with, or made close to, the surface of the electrophotographic photoreceptor 1 and rotated opposite the electrophotographic photoreceptor 1, thereby allowing the toner to adhere to the latent image on the surface of the electrophotographic photoreceptor 1, to form a toner image thereon.

The development system can make use of a known system, and the development system where the developer is a two-component developer includes, but is not limited to, a cascade system, a magnetic brush system etc.

In a preferable embodiment, the developing unit has a developer holding member (magnetic roll) that holds a developer thereon and rotates opposite the electrophotographic photoreceptor (latent image holding member) 1 to deliver the developer to the electrophotographic photoreceptor 1.

Particularly, the developer holding member is rotated preferably at a circumferential velocity in the range of 200 mm/sec to 800 mm/sec, more preferably in the range of 300 mm/sec to 700 mm/sec. When the circumferential velocity of the magnetic roll is in this range, higher speed in recent years can be coped with, high-density image reproducibility is improved, and particularly in application to a small developing machine, the warpage of a layer-forming member attributable to the deficient mechanical strength of the developing machine can be prevented, and the reduction in density reproducibility due to an uneven developer on the developer holding member can be suppressed.

In the transfer step, the toner image formed on the surface of the electrophotographic photoreceptor 1 is transferred onto a recording medium to form a transferred image. In the transfer step in FIG. 1, a toner image is directly transferred onto a transfer material such as paper, or alternatively the toner image may be transferred onto a drum- or belt-shaped intermediate transfer member and then transferred onto a recording member such as paper.

The transfer device for transferring a toner image from the electrophoto graphic photoreceptor 1 to paper or the like may use a corotron. Alternatively, the transfer device may use a contact transfer system wherein an electroconductive transfer roll composed of an elastic material is abutted on the electrophotographic photoreceptor 1 thereby transferring a toner image onto paper, and the transfer device in the image forming apparatus of the invention is not particularly limited.

In the cleaning step, a cleaning blade as a cleaning unit is contacted directly with the surface of the electrophotographic photoreceptor 1, thereby removing the toner, paper dust, and other dust from the surface of the photoreceptor 1. As the cleaning unit, a cleaning brush, a cleaning roll or the like may be used besides the cleaning blade.

The generally used system in the cleaning step is a blade cleaning system wherein a blade made of rubber such as polyurethane is abutted on the electrophotographic photoreceptor. Use can also be made of a magnetic brush system having a magnet fixed therein and provided with a rotatable cylindrical nonmagnetic sleeve arranged in the outer periphery of the magnet, wherein a magnetic carrier is carried on the surface of the sleeve to recover a toner, or a system wherein an electroconductive resin fiber or animal hair is rendered rotatable in a rolled state, and bias of polarity opposite to the toner is applied to the roll to remove the toner. In the former magnetic brush system, a corotron for cleaning pretreatment may be arranged. In the invention, the cleaning system is not particularly limited.

In the recycling step, the residual toner removed from the surface of the electrophotographic photoreceptor 1 in the cleaning step is returned as recycled toner via the toner returning pipe 10 (recycling unit) to the developing device 3. The toner returning pipe 10 is provided therein with a carrier screw (not shown), and by the rotation of the carrier screw, the residual toner in the toner returning pipe 10 at the side of the cleaning device 5 is delivered to the side of the developing device 3.

Other examples of the recycling unit include a method wherein a residual toner removed by the cleaning device is supplied via a carrier conveyor to a toner supply opening or a developing device and a method wherein a toner for replenishment is mixed with a recycled toner in an intermediate chamber and returned to a developing device. A system of directly returning a residual toner to a developing device, or a system of mixing a toner for replenishment with a recycled toner in an intermediate chamber and returning the mixed toner to a developing device is a preferable system.

The developer is charged in a developing device so as to be able to form an image, may be a recycled toner-free initial developer or may contain a recycled toner during use, wherein the developer contain a toner at a density of about 3.0 to 15.0% by mass.

The toner image transferred onto the recording medium A is fixed with the fixing device 8. The fixing device 8 is preferably a heating fixing device using a heat roll. The heating fixing device is composed of a fixing roller having a cylindrical cored bar which has a heating heater lamp therein and which has a release layer of a heat-resistant resin coating layer or a heat-resistant rubber coating layer on the periphery thereof, and a pressure roller or a pressure belt abutting on the fixing roller and having a cylindrical cored bar or a belt-shaped base material provided thereon with a heat-resistant elastic layer. The process of fixing a non-fixed toner image involves passing a recording medium having a non-fixed toner image formed thereon, between the fixing roller and the pressure roller, or between the fixing roller and the pressure belt, thereby thermally melting the binder resin, additives etc. in the toner to fix the image. In the invention, the fixing system is not particularly limited.

When a full-color image is formed in the invention, it is preferable to use a method wherein plural electrophotographic photoreceptors each having a developing device for each color are used, and by a series of steps including a latent image forming step, a developing step, a transferring step and a cleaning step, toner images of the respective colors are laminated in order on the surface of a recording medium (tandem system), and laminated full-color toner images are thermally fixed.

In the image forming apparatus of the invention, an electrophotographic photoreceptor and at least one unit selected from a charging unit, a latent image forming unit, a developing unit, a transferring unit, a cleaning unit and a recycling unit are formed into one body to constitute a process cartridge which may, as a single unit, be attached to and detached from the image forming apparatus via a guiding unit such as a rail of the body of the apparatus.

<Process Cartridge>

The process cartridge in this exemplary embodiment includes at least a developer holding member and uses the developer in this exemplary embodiment. The process cartridge may further contain an image holding member, a charging unit, a toner eliminating unit, etc.

<Toner Cartridge>

The toner cartridge in this exemplary embodiment is attached detachably to an image forming apparatus including at least a development unit and accommodates a toner-containing developer to be supplied to the toner image forming unit, wherein the toner is a toner in the exemplary embodiment. The toner cartridge in the exemplary embodiment may accommodate at least the toner, and may accommodate a developer for example, depending on the mechanism of the image informing apparatus.

EXAMPLES

Hereinafter, the present invention will be described in detail with reference to the Examples, but the invention is not limited to these examples.

In the Examples, "part" and "%" mean "part by weight" and "% by weight" respectively unless otherwise noted.

<Preparation of Specific External Additive Particle (1)>

| | |
|---|---|
| Styrene | 200 parts by weight |
| Divinyl benzene | 10 parts by weight |
| Acrylic acid | 10 parts by weight |

The above-mentioned components are mixed and dissolved. Separately, a solution having 6 parts of an anionic surfactant DOWFAX (manufactured by Dow Chemical Company) dissolved in 600 parts of deionized water is placed in a 2-L flask, and the mixed solution obtained above is added to the flask and dispersed and emulsified. While the mixture is stirred and mixed with a half-moon stirring blade at 10 rpm, a solution of 10 parts of ammonium persulfate dissolved in 50 parts of deionized water is introduced into the reaction mixture. The introduction of this solution of ammonium persulfate is carried out at a rate of 50 parts by weight/30 min.

Then, after the atmosphere in the system is replaced by nitrogen, the reaction mixture is stirred with a stirring blade at a revolution number of 30 rpm in the flask and simultaneously heated on an oil bath at 80° C. for 24 hours, to carry out emulsion polymerization, thereby yielding resin particle-dispersed slurry.

The resin particle-dispersed slurry is centrifuged to remove a supernatant, and then the resin particles are re-dispersed in deionized water at 25° C. that is 100-times as large as the resin particle solids, then centrifuged and washed with water. This operation is repeated 5 times, thereby giving a primary particle dispersion liquid (1) (content of primary particles: 30% by mass).

For confirmation of the particle diameter and shape of the primary particles, a part of the primary particle dispersion liquid (1) thus obtained is dried in a vacuum freeze-drying machine, to remove the solvent, thereby obtaining a primary particle (1) for forming specific external additive particles. The number-average long axis diameter of the primary particles measured by the method described above is 0.04 μm, and the shape factor SF1 is 108.

10 parts by weight of polyaluminum chloride (10% aqueous solution) is added to 200 parts of the primary particle dispersion liquid (1), and the mixture is mixed and dispersed in a round stainless steel flask by Ultra-Turrax T50, manufactured by IKA® and then heated to 55° C. under stirring with a stirring blade at 60 rpm in the flask on a heating oil bath. The mixture is kept at 55° C. (initial heating temperature), and after the number of revolutions of the stirring blade is reduced to 5 rpm, 92 parts by weight of the primary particle dispersion liquid (1) is further added over 30 minutes, and the mixture is heated to 90° C. and kept at this temperature for 15 minutes. This slurry is centrifuged to remove a supernatant, and then the resin particles are re-dispersed in deionized water at 25° C. that is 100-times as large as the resin particle solids, then centrifuged and washed with water. This operation is repeated 5 times, and the resin particles are dried in a vacuum freeze-drying machine to give a specific external additive particle (1) constituted of irreversibly coalesced primary particles, the average number of which is 22. The number-average long axis diameter of the specific external additive particle (1) thus obtained is 0.19 μm. When the specific external additive particle (1) is photographed under a scanning microscope and observed, the shape factor SF2 is 122.

1 part by weight of the particle (1) is added to a toner for an Apeos Port-II C7500 manufactured by Fuji Xerox Co., Ltd., and 10 parts of this model toner is mixed with 100 parts by weight of a carrier for an Apeos Port-II C7500 manufactured by Fuji Xerox Co., Ltd., thereby forming a model developer. This model developer is examined in a running test with the image forming apparatus described above. When the toner particles after undergoing stress in the image forming apparatus are observed, the degree of re-dispersion of the specific external additive particles is 3% by number.

<Preparation of Specific External Additive Particle (2)>

A specific external additive particle (2) constituted of irreversibly coalesced primary particles, the average number of which is 250, is obtained in the same manner as for the specific external additive particle (1) except that polyvinyl alcohol having a saponification degree of 82 mol % is added, to a concentration of 10%, to the primary particle dispersion liquid (1), then dispersed and centrifuged to remove a supernatant. The number-average long axis diameter of the specific external additive particle (2) thus obtained is 0.71 μm. When the specific external additive particle (2) is photographed under a scanning microscope and observed, the shape factor SF2 is 113.

When the particle (2) is subjected to the same running test with the image forming apparatus as for the specific external additive particle (1) to observe the toner particles, the degree of re-dispersion of the specific external additive particles is 5% by number.

<Preparation of Specific External Additive Particle (3)>

A specific external additive particle (3) constituted of irreversibly coalesced primary particles, the average number of which is 4, is obtained in the same manner as for the specific external additive particle (1) except that the amount of polyaluminum chloride (10% aqueous solution) added to the first primary particle dispersion liquid (1) is 2 parts by weight, and addition of the primary particle dispersion liquid (1) is not conducted after addition of polyaluminum chloride. The number-average long axis diameter of the specific external additive particle (3) thus obtained is 0.08 μm. When the specific external additive particle (3) is photographed under a scanning microscope and observed, the shape factor SF2 is 138.

When the particle (3) is subjected to the same running test with the image forming apparatus as for the specific external additive particle (1) to observe the toner particles, the degree of re-dispersion of the specific external additive particles is 10% by number.

<Preparation of Specific External Additive Particle (4)>

1000 parts by weight of the same primary particle dispersion liquid (1) as used in preparation of the specific external additive particle (1) is placed in a 2-L flask, and 2 parts by weight of sodium lauryl sulfate is added thereto, and the mixture is stirred at 80° C. in a nitrogen atmosphere. 20 parts by weight of divinyl benzene having 2 parts by weight of benzoyl peroxide dissolved therein is added dropwise thereto, and then the mixture is stirred at 90° C. for 5 hours.

This slurry is centrifuged to remove a supernatant, and then the resin particles are re-dispersed in deionized water at 25° C. that is 100-times as large as the resin particle solids, then centrifuged and washed with water. This operation is repeated 5 times. The resulting resin particles are dried in a vacuum freeze-drying machine to give a specific external additive particle (4) constituted of irreversibly coalesced primary particles, the average number of which is 280. The number-average long axis diameter of the specific external additive particle (4) thus obtained is 1.01 μm. When the specific external additive particle (4) is photographed under a scanning microscope and observed, the shape factor SF2 is 112.

When the particle (4) is subjected to the same running test with the image forming apparatus as for the specific external additive particle (1) to observe the toner particles, the degree of re-dispersion of the specific external additive particles is 0% by number. The number-average long axis diameter of the primary particles is 0.05 μm.

<Preparation of Specific External Additive Particle (5)>

As the primary particles, rutile type titania having a number-average long axis diameter of 0.07 μm is used. 10 parts by weight of the primary particles, 3 parts by weight of polyoxyethylene (10) octyl phenyl ether and 10 parts by weight of polyvinyl alcohol having a saponification degree of 82 mol % are dispersed in 100 parts by weight of deionized water and sufficiently stirred to form a dispersion which is then subjected to spray drying, milling and classification to give a specific external additive particle (5) constituted of irreversibly coalesced primary particles, the average number of which is 200. The number-average long axis diameter of the specific external additive particle (5) thus obtained is 1.2 μm. When the specific external additive particle (5) is photographed under a scanning microscope and observed, the shape factor SF2 is 128.

When the particle (5) is subjected to the same running test with the image forming apparatus as for the specific external additive particle (1) to observe the toner particles, the degree of re-dispersion of the specific external additive particles is 18% by number.

<Preparation of Specific External Additive Particle (6)>

| | |
|---|---|
| Methyl methacrylate | 150 parts by weight |
| Acrylic acid | 10 parts by weight |

The above-mentioned components are mixed and dissolved. Separately, a solution having 10 parts by weight of an anionic surfactant DOWFAX (manufactured by Dow Chemical Company) dissolved in 600 parts by weight of deionized water is placed in a 2-L flask, and the mixed solution obtained above is added to the flask and dispersed and emulsified. While the mixture is stirred and mixed with a stirring blade at 10 rpm for 5 minutes, an aqueous solution of 12 parts by weight of ammonium persulfate dissolved in 60 parts of deionized water is introduced into the mixture.

Then, after the atmosphere in the system is replaced by nitrogen, the reaction mixture is stirred at 30 rpm with a stirring blade in the flask and simultaneously heated on an oil bath at 90° C. for 25 hours, to carry out emulsion polymerization, thereby yielding resin particle-dispersed slurry. The resin particle-dispersed slurry is centrifuged to remove a supernatant, and then the resin particles are re-dispersed in deionized water at 25° C. that is 100-times as large as the resin particle solids, then centrifuged and washed with water. This operation is repeated 5 times, thereby giving a primary particle dispersion liquid (2) (content of solid: 30% by mass). The number-average long axis diameter of the primary particles is 0.001 μm.

8 parts by weight of polyaluminum chloride (10% aqueous solution) is added to 200 parts of the primary particle dispersion liquid (2) thus obtained, and the mixture is sufficiently mixed and dispersed in a round stainless steel flask by Ultra-Turrax T50, manufactured by IKA® and then heated to 55° C. under stirring at 10 rpm with a stirring blade in the flask on a heating oil bath. The mixture is kept at 55° C. (initial heating temperature), and 92 parts by weight of the primary particle dispersion liquid (2) is further added over 30 minutes, and the mixture is heated to 90° C. and kept at this temperature for 15 minutes to give slurry. This slurry is centrifuged to remove a supernatant, and then the resin particles are re-dispersed in deionized water at 25° C. that is 100-times as large as the resin particle solids, then centrifuged and washed with water. This operation is repeated 5 times, and the resin particles are dried in a vacuum freeze-drying machine to give a specific external additive particle (6) constituted of irreversibly coalesced primary particles, the average number of which is 12. The number-average long axis diameter of the specific external additive particle (6) thus obtained is 0.04 μm. When the specific external additive particle (6) is photographed under a scanning microscope and observed, the shape factor SF2 is 125.

When the particle (6) is subjected to the same running test with the image forming apparatus as for the specific external additive particle (1) to observe the toner particles, the degree of re-dispersion of the specific external additive particles is 14% by number.

<Preparation of Specific External Additive Particle (7)>

As the primary particles, silicone resin particles having a number-average long axis diameter of 1.01 μm are used. 10 parts by weight of the primary particles, 1 part by weight of polyoxyethylene (10) octyl phenyl ether and 10 parts by weight of polyvinyl alcohol having a saponification degree of 82 mol % are dispersed in 100 parts by weight of deionized water and sufficiently stirred to form a dispersion which is then centrifuged to remove a supernatant and then to freeze-drying, milling and classification to give a specific external additive particle (7) constituted of irreversibly coalesced primary particles, the average number of which is 7. The number-average long axis diameter of the specific external additive particle (7) thus obtained is 3.2 μm. When the specific external additive particle (7) is photographed under a scanning microscope and observed, the shape factor SF2 is 140.

When the particle (7) is subjected to the same running test with the image forming apparatus as for the specific external additive particle (1) to observe the toner particles, the degree of re-dispersion of the specific external additive particles is 15% by number.

<Preparation of Specific External Additive Particle (8)>

A specific external additive particle (8) constituted of irreversibly coalesced primary particles, the average number of which is 150, is obtained in the same manner as for the specific external additive particle (5) except that fumed silica having a number-average long axis diameter of 0.005 μm is used as primary particles. The number-average long axis diameter of the specific external additive particle (8) thus obtained is 0.07 μm. When the specific external additive particle (8) is photographed under a scanning microscope and observed, the shape factor SF2 is 117.

When the particle (8) is subjected to the same running test with the image forming apparatus as for the specific external additive particle (1) to observe the toner particles, the degree of re-dispersion of the specific external additive particles is 3% by number.

<Preparation of Toner Particle (1)>

(Synthesis of Non-Crystalline Polyester Resin (1))

A two-necked flask dried by heating is charged with 70 parts by mole of polyoxypropylene(2,2)-2,2-bis(4-hydroxyphenyl)propane, 80 parts by mole of ethylene glycol, 15 parts by mole of 1,4-cyclohexane diol, 5 parts by mole of 1,3-propane diol, 60 parts by mole of terephthalic acid and 30 parts by mole of 2,6-naphthalenedicarboxylic acid as the starting materials and also with dibutyltin oxide as the catalyst. Nitrogen gas is introduced into the flask so that the mixture is kept under the inactive atmosphere. The mixture is then heated, subjected to polycondensation polymerization reaction at a temperature within the range of 80 to 130° C. for about 12 hours, and depressurized gradually at a temperature within the range of 150 to 160° C. to synthesize a non-crystalline polyester resin (1).

The weight-average molecular weight (Mw) of the resulting non-crystalline polyester resin (1) is 9800. The melting temperature of the non-crystalline polyester resin (1) is measured with a differential scanning calorimeter (DSC) and obtained in analysis by JIS standards (see JIS K-7121).

As a result, no clear peak is shown, and a mild change in endothermic quantity is observed. The glass transition temperature (Tg) that is a midpoint of this change in endothermic quantity is 47° C.

(Synthesis of Crystalline Polyester Resin (1))

A three-necked flask dried by heating is charged with 39 parts by mass of dimethyl sebacate, 29 parts by weight of 1,6-hexane diol, 25 parts by weight of dimethylsulfoxide, 1.5 parts by weight of fumaric acid and 0.015 part by mass of catalyst dibutyltin oxide, and after the air in the container is replaced by a nitrogen gas through depressurization, the mixture is stirred in the inactive atmosphere under mechanical stirring at 120° C. for 8 hours. The dimethylsulfoxide is distilled away under reduced pressure, and thereafter, the mixture is gradually heated to 150° C. under reduced pressure and stirred for 3 hours. When the mixture becomes viscous, it is air-cooled to terminate the reaction, whereby aliphatic crystalline polyester resin (1) is synthesized.

When the molecular weight is measured in the same manner as for the non-crystalline polyester resin (1), the weight-average molecular weight (MW) of the resulting aliphatic crystalline polyester resin (1) is 8300. When the melting temperature is measured in the same manner as for the non-crystalline polyester resin (1) to obtain its DSC spectrum, the aliphatic crystalline polyester resin (1) has a clear peak, and the melting temperature (Tm1) is 58° C.

(Non-Crystalline Polyester Resin Dispersion Liquid (1))

180 parts of the non-crystalline polyester resin (1) obtained as described above, 250 parts of ethyl acetate, and 0.08 part of a sodium hydroxide aqueous solution (0.5 N) are placed in a 500-ml separable flask, heated at 65° C., and stirred with a Three-one motor (manufactured by Shinto Scientific Co., Ltd.), thereby preparing a resin mixed solution. While the resin mixed solution is further stirred, 400 parts of deionized water is slowly added to cause phase inversion emulsification, and the solvent is removed, thereby obtaining a non-crystalline polyester resin dispersion liquid (1).

(Crystalline Polyester Resin Dispersion Liquid (1))

180 parts of the crystalline polyester resin (1) obtained as described above, 250 parts of ethyl acetate, and 0.08 part of a sodium hydroxide aqueous solution (0.5 N) are placed in a 500-ml separable flask, heated at 65° C., and stirred with a Three-one motor (manufactured by Shinto Scientific Co., Ltd.), thereby preparing a resin mixed solution. While the resin mixed solution is further stirred, 400 parts of deionized water is slowly added to cause phase inversion emulsification, and the solvent is removed, thereby obtaining a crystalline polyester resin dispersion liquid (1).

(Releasing Agent Dispersion Liquid (1))

Paraffin wax (melting temperature: 66° C.): 45 parts

Anionic surfactant (NEOGEN RK, manufactured by Dai-Ichi Kogyo Seiyaku Co., Ltd.): 1.0 part Deionized water: 180 parts The above components are mixed and heated to 85° C., and dispersed using a homogenizer (Ultra-Turrax T50, manufactured by IKA®), followed by dispersion treatment in a manton gaulin high pressure homogenizer (manufactured by APV Gaulin, INC.), thereby preparing a releasing agent dispersion liquid having a releasing agent dispersed therein.

(Colorant Dispersion Liquid)

Cyan pigment (Pigment Blue 15:3 (copper phthalocyanine) manufactured by Dainichiseika Color & Chemicals Mfg. Co., Ltd.): 1200 parts Anionic surfactant (NEOGEN SC, manufactured by Dai-Ichi Kogyo Seiyaku Co., Ltd.): 2.3 parts Deionized water: 10000 parts The above components are mixed, dissolved, and dispersed for about 5 hours with a high pressure impact disperser (Ultimizer HJP30006, manufactured by Sugino Machine Limited) to prepare a colorant dispersion liquid having a colorant (cyan pigment) dispersed therein.

<Production of Toner Particle (1)>

Crystalline polyester resin dispersion liquid (1): 70 parts

Non-crystalline polyester resin dispersion liquid (1): 200 parts

Colorant dispersion liquid: 28 parts

Releasing agent dispersion liquid (1): 70 parts

Anionic surfactant (Teyca Power): 3.0 parts

—Emulsification Step—

The above-described raw materials are placed in a 2-L cylindrical stainless steel vessel and mixed by dispersion at 4000 rpm for 45 minutes under shearing force with a homogenizer (Ultra-Turrax T50, manufactured by IKA®). Then, 4.0 parts of 5% nitric acid aqueous solution of polyaluminum chloride as a coagulant is slowly added dropwise, and mixed by dispersion at 6500 rpm for 30 minutes with the homogenizer, thereby obtaining raw material dispersion liquid.

—Aggregation Step—

Thereafter, the raw material dispersion liquid is transferred to a polymerization vessel equipped with a stirring device and a thermometer and then heated with a mantle heater, and the growth of aggregated particles is promoted at 39° C. At that time, the pH of the raw material dispersion liquid is adjusted between 3.5 and 4.1 with 0.1 N aqueous nitric acid or 0.5 N aqueous sodium hydroxide. The raw material dispersion liquid is maintained in the above pH range for about 3 hours, thereby forming aggregated particles.

—Coalescing Step—

Subsequently, 85 parts of the non-crystalline polyester resin dispersion liquid (1) is further added to the raw material dispersion liquid, whereby the resin particles of the non-crystalline polyester resin (1) are adhered to the surfaces of the above aggregated particles. Further the temperature of the raw material dispersion liquid is increased to 42° C., and the aggregated particles are conditioned while the diameter and shape of the particles are examined with an optical microscope and Multisizer II. Thereafter, the raw material dispersion liquid is adjusted to pH 7.5 by adding an aqueous solution of NaOH dropwise to fuse the aggregated particles, and then the temperature of the raw material dispersion liquid is increased to 82° C. Thereafter, the raw material dispersion liquid is left for 5 hours to fuse the aggregated particles, then the coalesce of the aggregated particles is confirmed with an optical microscope, and the raw material dispersion liquid is cooled at a decreasing temperature rate of 0.5° C./minute.

—Washing Step—

[Step of Washing with a Treatment Solution having pH 9 to 10]

Thereafter, the raw material dispersion liquid is adjusted to pH 9.0 at 22° C. with 0.5 N aqueous nitric acid or 0.5 N aqueous sodium hydroxide, then stirred for 45 minutes and sieved through a mesh having a pore size of 32 μm. Then, the raw material dispersion liquid is filtered. After solid-liquid separation, the toner is dispersed in deionized water at 35° C. that is 50-times as large as the toner solids, stirred for 45 minutes and filtered. This operation is repeated 5 times.

[Step of Adjusting to pH 4 or Less and Subsequent Washing with Ion-Exchange Resin Under Sonication]

Thereafter, the toner is re-dispersed in deionized water at 28° C. that is 50-times as large as the toner solids, and 10 parts by weight of an ion-exchange resin is added to 100 parts by weight of the toner and washed for 30 minutes while the dispersion is adjusted to pH 4 or less with 3 N nitric acid under application of 38 kHz with an ultrasonic washing machine (W-115T manufactured by HONDA ELECTRONICS Co., LTD.). Thereafter, the resulting dispersion is filtered.

[Step of Washing with Deionized Water]

The above described steps of [Step of washing with a treatment solution having pH 9 to 10] and [Step of adjusting to pH 4 or less and subsequent washing with ion-exchange resin under sonication] are repeated 5 times, and then the toner is re-dispersed in deionized water at 25° C. that is 50-times as large as the toner solids and then washed with water. This operation is repeated 5 times.

—Drying of the Toner—

After the washing step is finished, the toner is dried in a vacuum freeze-drying machine to give a toner particle (1).

The volume-average particle diameter of the resulting toner particle (1) is 6.9 μm, and the glass transition temperature thereof is 55° C.

<Preparation of Toner Particle (2)>

—Preparation of Polystyrene Particle Dispersion Liquid (1)—

Styrene: 310 parts by weight
n-Butyl acrylate: 120 parts by weight
Acrylic acid: 5 parts by weight
1-Dodecanethiol: 5 parts by weight
Propanediol acrylate: 2.2 parts by weight The above-mentioned components are mixed and dissolved. Separately, a solution having 5 parts by weight of an anionic surfactant DOWFAX (manufactured by Dow Chemical Company) dissolved in 600 parts by weight of deionized water is placed in a 2-L flask, and after the mixed solution described above is added thereto, the dispersion is dispersed and emulsified, followed by adding 50 parts by weight of an aqueous solution of 6 parts by weight of ammonium persulfate in deionized water to the reaction mixture under gentle stirring and mixing for 20 minutes.

Then, the atmosphere in the system is replaced by nitrogen, and the reaction mixture is stirred in the flask and simultaneously heated on an oil bath, and then subjected to emulsion polymerization.

A polystyrene particle dispersion liquid (1) is thereby obtained.

(Production of Toner Particle (2))

Crystalline polyester resin dispersion liquid (1): 70 parts
Polystyrene particle dispersion liquid (1): 200 parts
Colorant dispersion liquid: 28 parts
Releasing agent dispersion liquid (1): 70 parts
Anionic surfactant (Teyca Power): 3.0 parts The above-described raw materials are placed in a 2-L cylindrical stainless steel vessel and mixed by dispersion at 4000 rpm for 45 minutes under shearing force with a homogenizer (Ultra-Turrax T50, manufactured by IKA®). Then, 4.0 parts of 5% nitric acid aqueous solution of polyaluminum chloride as a coagulant is slowly added dropwise, mixed by dispersion at 6500 rpm for 30 minutes with the homogenizer, thereby obtaining a raw material dispersion liquid.

—Aggregation Step—

Thereafter, the raw material dispersion liquid is transferred to a polymerization vessel equipped with a stirring device and a thermometer, heating is initiated with a mantle heater, and the growth of the aggregated particles is promoted at 39° C. At that time, the pH of the raw material dispersion liquid is adjusted between 3.5 and 4.1 with 0.1 N aqueous nitric acid or 0.5 N aqueous sodium hydroxide. The raw material dispersion liquid is maintained in the above-described pH range for about 3 hours, thereby forming aggregated particles.

—Coalescing Step—

Subsequently, 85 parts of the non-crystalline polyester resin dispersion liquid (1) is further added to the raw material dispersion liquid, whereby the resin particles in the non-crystalline polystyrene resin (1) are adhered to the surface of the above aggregated particles. Further, the temperature of the raw material dispersion liquid is increased to 42° C., and the aggregated particles are conditioned while the diameter and shape of the particles are examined with an optical microscope and Multisizer II. Thereafter, the raw material dispersion liquid is adjusted to pH 7.5 by adding an aqueous solution of NaOH dropwise to coalesce the aggregated particles, and then the temperature of the raw material dispersion liquid is increased to 82° C. Thereafter, the raw material dispersion liquid is left for 5 hours to coalesce the aggregated particles, then the coalesce of the aggregated particles is confirmed with an optical microscope, and the raw material dispersion liquid is cooled at a decreasing temperature rate of 0.5° C./minute.

—Washing Step, Drying Step—

Toner particle (2) is obtained in the washing step and drying step conducted in the same manner as in preparation of the toner particle (1). The volume-average particle diameter of the resulting toner mother particle (2) is 4.8 μm, and the glass transition temperature thereof is 48° C.

<Prepration of Toner Particle (3)>

(Release Agent Particle Dispersion Liquid (2))

Carnauba wax (melting temperature 82° C.): 45 parts by weight

Anionic surfactant (NEOGEN SC, solid content 65%, manufactured by Dai-Ichi Kogyo Seiyaku Co., Ltd.): 2.3 parts by weight Deionized water: 200 parts by weight The above components are mixed and heated to 85° C., and dispersed using a homogenizer (Ultra-Turrax T50, manufactured by IKA®), followed by dispersion treatment in a manton gaulin high pressure homogenizer (manufactured by APV Gaulin, INC.), thereby preparing a releasing agent dispersion liquid having a releasing agent dispersed therein.

(Production of Toner Particle (3))

Polystyrene particle dispersion liquid (1): 200 parts

Colorant dispersion liquid: 128 parts

Releasing agent dispersion liquid (2): 70 parts

Anionic surfactant (Teyca Power): 3.0 parts

—Emulsification Step—

The above-described raw materials are placed in a 2-L cylindrical stainless steel vessel and mixed by dispersion at 4000 rpm for 45 minutes under shearing force with a homogenizer (Ultra-Turrax T50, manufactured by IKA®). Then, 4.0 parts of 5% nitric acid aqueous solution of polyaluminum chloride as a coagulant is slowly added dropwise, mixed by dispersion at 6500 rpm for 30 minutes with the homogenizer, thereby obtaining a raw material dispersion liquid.

—Aggregation Step—

Thereafter, the raw material dispersion liquid is transferred to a polymerization vessel equipped with a stirring device and a thermometer and heated with a mantle heater, and the growth of aggregated particles is promoted at 80° C. At that time, the pH of the raw material dispersion liquid is adjusted between 6.3 and 6.8 with 0.1 N aqueous nitric acid or 0.5 N aqueous sodium hydroxide. The raw material dispersion liquid is maintained in the above pH range for about 6 hours, thereby forming aggregated particles.

—Coalescing Step—

Subsequently, 85 parts of the polystyrene particle dispersion liquid (1) is further added to the raw material dispersion liquid, whereby the polystyrene resin particles are adhered to the surfaces of the above aggregated particles. Further, the temperature of the raw material dispersion liquid is increased to 52° C., and the aggregated particles are conditioned while the diameter and shape of the particles are examined with an optical microscope and Multisizer II. Thereafter, the raw material dispersion liquid is adjusted to pH 7.5 by adding-an aqueous solution of NaOH dropwise to coalesce the aggregated particles, and then the temperature of the raw material dispersion liquid is increased to 87° C. Thereafter, the raw material dispersion liquid is left for 5 hours to coalesce the aggregated particles, then the coalesce of the aggregated particles is confirmed with an optical microscope, and the raw material dispersion liquid is cooled at a decreasing temperature rate of 0.5° C./minute.

—Washing Step, Drying Step—

Toner mother particle (3) is obtained in the washing step and drying step conducted in the same manner as in preparation of the toner mother particle (1). The volume-average particle diameter of the resulting toner mother particle (3) is 6.4 μm, and the glass transition temperature thereof is 75° C.

Example 1

<Preparation of Toner (1)>

100 parts by weight of the toner particle (1) obtained above, 1.5 parts by weight of HMDS (Hexamethyldisilazane)-treated hydrophobic silica particles (primary particle diameter of 0.012 μm), and 1 part by weight of the specific external additive particle (1) obtained above are introduced into a 5-L Henschel mixer with a jacket through which cooling water is running, and the mixture is blended for 20 minutes under stirring with a stirring blade rotated at a circumferential velocity of 28 m/s, followed by removing coarse particles through a mesh having an opening of 45 μm, thereby giving toner (1). The number-average number of the specific external additive particles (1) adhered to one particle of the toner (1) is 95.

10 parts by weight of the resulting toner is mixed with 100 parts by weight of a carrier for an Apeos Port-II C7500 manufactured by Fuji Xerox Co., Ltd., to prepare a developer, this developer is arranged in a developing device in the image forming apparatus Apeos Port-II C7500 manufactured by Fuji Xerox Co., Ltd., and the toner (1) is arranged in a toner cartridge in the same image forming apparatus. The apparatus is operated with an output of 5% image area on a recording medium in an atmosphere of 20° C. and 65% humidity. When the toner particles recovered in the recovery device are observed after 10,000 sheets of paper are outputted, the re-dispersion of the specific external additive particles (1) to the primary particles is hardly observed. At this time, the re-dispersion degree is 2% by number.

Examples 2 TO 10

<Toners (2) to (10)>

Toners (2) to (10) are obtained in the same manner as in preparation of toner (1) except that the toner particles, the specific external additive particles and other components are combined as shown in Table 1. The number-average number of the specific external additive particles adhered to one particle of each toner is 7 in Example 2, 350 in Example 3, 6 in Example 4, 4 in Example 5, 400 in Example 6, 1.5 in Example 7, 280 in Example 8, 71 in Example 9, and 87 in Example 10.

When each of these toners is arranged in the image forming apparatus and evaluated in the same manner as in Example 1, the re-dispersion of the specific external additive particles to the primary particles is hardly observed. At this time, the re-dispersion degree is 2% by number in Example 2, 5% by number in Example 3, 0% by number in Example 4, 12% by number in Example 5, 7% by number in Example 6, 10% by number in Example 7, 0% by number in Example 8, 2% by number in Example 9, and 2% by number in Example 10.

Comparative Example 1

The toner in Comparative Example 1 is prepared in the same manner as for the toner (1) except that the specific external additive particles (1) are not added.

Comparative Example 2

The toner in Comparative Example 2 is prepared in the same manner as for the toner (1) except that silicone resin particles having a number-average long axis diameter of 0.25 μm are used in place of the specific external additive particles (1). The number-average number of the silicone resin particles (primary particles) adhered to one particle of the toner is 55.

When the toner is arranged in the toner cartridge in the image forming apparatus and evaluated in the same manner as in Example 1, the deformation of the silicone resin particles (primary particles) is not observed, but the silicone resin particles are significantly released from, or buried in, the toner particles.

Comparative Example 3

100 parts by weight of the toner particle (1) and 1.5 parts by weight of HMDS-treated hydrophobic silica particles (primary particle diameter of 0.012 μm) are introduced into a 5-L Henschel mixer with a jacket through which cooling water is running, and the mixture is blended for 20 minutes under stirring with a stirring blade rotated at a circumferential velocity of 28 m/s, and after cooling water in the jacket of 5 L-HM is changed to warm water at 40° C., 1 part by weight of the primary particles (1) used in preparing the specific external additive particle (1) is further added thereto, and the mixture is blended for 30 minutes under stirring with a stirring blade rotated at a circumferential velocity of 8 m/s, followed by removing coarse particles through a mesh having an opening of 45 μm, thereby giving the toner in Comparative Example 3.

When the resulting toner is observed with an electron microscope, the primary particles (1) are adhered in an aggregated state onto the toner particle (1), and the number-average long axis diameter of this aggregate is 0.36 μm, and the primary particle diameter is 0.04 μm. The number-average number of aggregates of the primary particles (1) adhered to one particle of the toner is 30.

When the toner is arranged in the toner cartridge in the image forming apparatus and evaluated in the same manner as in Example 1, the external additive particles are re-dispersed in the state of primary particles and adhered to and buried in the toner particles. At this time, the re-dispersion degree is 79% by number.

Comparative Example 4

The toner in Comparative Example 4 is prepared in the same manner as for the toner (1) except that the primary particle (1) used in preparing the specific external additive particle (1) is used in place of the specific external additive particle (1).

When the resulting toner is observed with an electron microscope, the primary particles (1) are adhered in a dispersed state onto the toner particle (1), and the primary particle diameter is 0.04 μm. The number-average number of the primary particles (1) adhered to one particle of the toner is 600. When the toner is arranged in the toner cartridge in the image forming apparatus and evaluated in the same manner as in Example 1, the primary particles (1) are significantly deformed and buried in the toner particles.

<Evaluation of Physical Properties of Toner>

An experimental machine capable of outputting 115 sheets/min. is produced by modifying the driving of the image forming apparatus Apeos Port-II C7500 manufactured by Fuji Xerox Co., Ltd.

This experimental machine is installed in an environment at a temperature of 32° C. and 87% humidity, and each of the toners in Examples 1 to 10 is charged in the toner cartridge and evaluated under the following conditions.

This image forming apparatus is used in a double-sided output mode to successively form images alternately with low image density (image area coverage of 0.5%) on 1000 sheets of paper and images with high image density (image area coverage of 30%) on 1000 sheets of paper until 100,000 sheets of paper are printed with images.

The paper used is printing paper CP (high-quality printing paper) manufactured by Fuji Xerox Co., Ltd.

While printing is continued, abnormal noises (gear noise, rubbing noise, vibration noise) derived from the waste-toner carrier device during the test are confirmed.

Image qualities after outputting of images on 100,000 sheets of paper are also confirmed. Confirmation of image quality is carried out by outputting a blank image, a full-face halftone image with an image density of 45%, and an image including 8-point letters and lines.

After outputting of images on 100,000 sheets of paper, the presence or absence of adhered materials and flaws on the surface of the photoreceptor in the apparatus is visually checked.

The results are shown in Table I below.

TABLE 1

| | Toner particle | Specific external additive or comparative external additive | Number-average long axis diameter D2 (μm) of external additive particles | Number-average long axis diameter D1 (μm) of primary particles | Particle diameter ratio D2/D1 | Evaluation Results: Clogging with waste toner | Number of sheets when abnormal noises occurs in carrier path for waste toner | Stain on outputted image after 100000 sheets | Flaws on photoreceptor after outputting on 100000 sheets |
|---|---|---|---|---|---|---|---|---|---|
| Example 1 | 1 | Specific external additive (1) | 0.19 | 0.04 | 4.75 | Not generated | No noise | Not generated | Not abnormal |
| Example 2 | 1 | Specific external additive (2) | 0.71 | 0.04 | 17.75 | Not generated | No noise | Not generated | Slight flaw |
| Example 3 | 1 | Specific external additive (3) | 0.08 | 0.04 | 2.00 | Not generated | Slight noise after printing on 56000th sheet | Not generated | Not abnormal |
| Example 4 | 1 | Specific external additive (4) | 1.01 | 0.05 | 20.20 | Not generated | No noise | Slight density irregularity | Slight flaw/adhering material |
| Example 5 | 1 | Specific external additive (5) | 1.2 | 0.07 | 17.14 | Not generated | Slight noise after printing on 92000th sheet | Slight color dots | Slight flaw/adhering material |

TABLE 1-continued

| | Toner particle | Specific external additive or comparative external additive | Number-average long axis diameter D2 (μm) of external additive particles | Number-average long axis diameter D1 (μm) of primary particles | Particle diameter ratio D2/D1 | Evaluation Results: Clogging with waste toner | Number of sheets when abnormal noises occurs in carrier path for waste toner | Stain on outputted image after 100000 sheets | Flaws on photoreceptor after outputting on 100000 sheets |
|---|---|---|---|---|---|---|---|---|---|
| Example 6 | 1 | Specific external additive (6) | 0.04 | 0.01 | 4.00 | Not generated | Slight noise after printing on 75000th sheet | Slight striated stain | Not abnormal |
| Example 7 | 1 | Specific external additive (7) | 3.2 | 1.01 | 3.17 | Not generated | Slight noise after printing on 33000th sheet | Slight color dots | Adhering material |
| Example 8 | 1 | Specific external additive (8) | 0.07 | 0.005 | 14.00 | Not generated | No noise | Slight striated stain | Not abnormal |
| Example 9 | 2 | Specific external additive (1) | 0.19 | 0.04 | 4.75 | Not generated | No noise | Not generated | Not abnormal |
| Example 10 | 3 | Specific external additive (1) | 0.19 | 0.04 | 4.75 | Not generated | No noise | Slight surface roughness | Not abnormal |
| Comparative Example 1 | 1 | — | — | — | — | Apparatus is stopped due to jamming in printing on 7000th sheet | Slight noise after printing on 4000th sheet after which noise increases until stop | Test is discontinued | Test is discontinued |
| Comparative Example 2 | 1 | Single spherical particle | 0.25 | — | — | Apparatus is stopped due to jamming in printing on 48000th sheet | Slight noise after printing on 18000th sheet and significant noise after printing on 42000th sheet | Test is discontinued | Test is discontinued |
| Comparative Example 3 | 1 | Reversibly aggregated particles | 0.36 | 0.04 | | Apparatus is stopped due to jamming in printing on 22000th sheet | Slight noise after printing on 9000th sheet and significant noise after printing on 15000th sheet | Test is discontinued | Test is discontinued |
| Comparative Example 4 | 1 | Single particle | 0.04 | — | — | Apparatus is stopped due to jamming in printing on 18000th sheet | Slight noise after printing on 13000th sheet after which noise increases until stop | Test is discontinued | Test is discontinued |

From the results in Table 1, it is revealed that as compared with the toners in the Comparative Examples, the toners for electrostatic image development in the exemplary embodiment, even when used for a long time, achieved suppression of lowering of the fluidity of the toners, clogging of the recovery system with toner particles due to aggregation of the particles or adhesion to the apparatus, and generation of abnormal noises in the toner carrier path. Moreover, it can be seen that staining of outputted images, and flaws in the photoreceptor, due to release of external additive particles are prevented. In Example 10, no flaw in the photoreceptor is observed, but staining in the fixing member, attributable to the toner, is slightly observed. Based on these results, more excellent effects are attained in Examples 1 and 9 satisfying the preferable conditions in the exemplary embodiment.

What is claimed is:

1. A toner for electrostatic image development, comprising a toner particle and external additive particles adhered to the surface of the toner particle, each of the external additive particles being constituted of a plurality of irreversibly coalesced primary particles, and the shape factor SF2 of the external additive particles, represented by the following formula (1), being in the range from [110] *128* to 160:

$$[(\text{particle perimeter})^2/(\text{particle projected area}\times 4\times\pi)]\times 100 \quad (1),$$

*wherein the number-average particle diameter D1 of the primary particles constituting the external additive particle and the number-average long axis diameter D2 of the external additive particle satisfies the relationship represented by the following formula (2):*

$$1.5\leq D2/D1\leq 15 \quad (2).$$

2. The toner for electrostatic image development of claim 1, wherein the amount of the external additive particles adhered to the surface of the toner particle is from 5 to 300 in terms of number-average number of the particles adhered to one toner particle.

[3. The toner for electrostatic image development of claim 1, wherein the number-average particle diameter D1 of the primary particles constituting the external additive particles and the number-average long axis diameter D2 of the external additive particles satisfy the relationship represented by the following formula (2):

$$1.5\leq D2/D1\leq 15 \quad (2).$$

]

4. The toner for electrostatic image development of claim 1, wherein the number-average long axis diameter of the external additive particles is from 0.06 μm to 1 μm.

5. The toner for electrostatic image development of claim 1, wherein the number-average long axis diameter of the primary particles is from 0.02 μm to 0.50 μm.

6. The toner for electrostatic image development of claim 1, wherein each of the external additive particle is obtained by coalescing from 2 to 300 primary particles on a projected area.

7. The toner for electrostatic image development of claim 1, wherein the glass transition temperature of the toner particle is from 35° C. to 70° C.

8. A toner cartridge that is attachable to and detachable from an image forming apparatus provided with a development unit, and accommodates the toner for electrostatic image development of claim 1 to be supplied to the development unit.

9. The toner for electrostatic image development of claim 1, wherein the irreversibly coalesced primary particles are organic particles, or inorganic particles that are adhered to one another with a binder resin.

10. A method of forming an image, the method comprising:

forming an electrostatic latent image on the surface of a latent image holding member;

developing the electrostatic latent image with a developer comprising the toner for electrostatic image development of claim 1, thereby forming a toner image;

transferring the toner image formed on the latent image holding member to the surface of a recording medium; and fixing the toner image on the surface of the recording medium, wherein the external additive particles included in the toner for electrostatic image development are constituted of a plurality of irreversibly coalesced organic primary particles.

11. A method of forming an image, the method comprising:

forming an electrostatic latent image on the surface of a latent image holding member;

developing the electrostatic latent image with a developer comprising the toner for electrostatic image development of claim 1, thereby forming a toner image;

transferring the toner image formed on the latent image holding member to the surface of a recording medium; and fixing the toner image on the surface of the recording medium, wherein the external additive particles included in the toner for electrostatic image development are constituted of a plurality of irreversibly coalesced inorganic primary particles that are adhered to one another with a binder resin.

12. A method for producing the toner for electrostatic image development of claim 1, the method comprising:

producing external additive particles, each of the external additive particles being produced by irreversibly coalescing a plurality of organic primary particles, and the shape factor SF2 of the external additive particles, represented by the following formula (1), being in the range from [110] *128* to 160; and mixing the external additive particles with toner particles so that the external additive particles adhere to the surface of each of the toner particles:

$$[(\text{particle perimeter})^2/(\text{particle projected area}\times 4\times\pi)]\times 100 \quad (1).$$

13. A method for producing the toner for electrostatic image development of claim 1, *wherein the primary particles are inorganic primary particles,* the method comprising:

producing external additive particles, each of the external additive particles being produced by irreversibly coalescing a plurality of *the* inorganic primary particles by adhering the plurality of inorganic primary particles to one another with a binder resin, and the shape factor SF2 of the external additive particles, represented by the following formula (1), being in the range from [110] *128* to 160; and mixing the external additive particles with toner particles so that the external additive particles adhere to the surface of each of the toner particles:

$$[(\text{particle perimeter})^2/(\text{particle projected area}\times 4\times\pi)]\times 100 \quad (1).$$

14. A toner for electrostatic image development, comprising a toner particle and external additive particles adhered to the surface of the surface of the toner particle, each of the external additive particles being constituted of a plurality of irreversibly coalesced organic primary particles or a plurality of irreversibly coalesced inorganic primary particles that are adhered to one another with a binder resin.

*15. The toner for electrostatic image development of claim 1, further comprising additional external additive particles adhered to the surface of the toner particle other than the external additive particles constituted of a plurality of irreversibly coalesced primary particles.*

*16. The toner for electrostatic image development of claim 1, further comprising re-dispersed primary particles adhered to the surface of the toner particle.*

*17. The toner for electrostatic image development of claim 1, further comprising up to 18% particles constituted of reversibly coalesced primary particles adhered to the surface of the toner particle based on a total number of particles constituted of coalesced primary particles adhered to the surface of the toner particle.*

*18. A toner for electrostatic image development, wherein the toner is formed by:*

*producing external additive particles by irreversibly coalescing a plurality of primary particles, the shape factor SF2 of the external additive particles, represented by the following formula (1), being in the range of from 128 to 160; and*

*mixing the external additive particles with toner particles so that the external additive particles adhere to the surface of each of the toner particles:*

$$[(\text{particle perimeter})^2/(\text{particle projected area}\times 4\times\pi)]\times 100 \quad (1),$$

*wherein the number-average particle diameter D1 of the primary particles constituting the external additive particle and the number-average long axis diameter D2 of the external additive particle satisfies the relationship represented by the following formula (2):*

$$1.5\leq D2/D1\leq 15 \quad (2).$$

*19. The toner for electrostatic image development of claim 18, wherein the primary particles are inorganic primary particles and are coalesced by adhering the plurality of inorganic primary particles to one another with a binder resin.*

*20. The toner for electrostatic image development of claim 18, wherein the primary particles are organic primary particles and are coalesced by heating to melt surfaces of the primary particles.*

*21. The toner for electrostatic image development of claim 1, wherein the individual primary particles have a shape factor SF1 in a range of from 100 to 130, the shape factor SF1 being represented by the following formula (3):*

$$SF1=((ML^2/A)\times(\pi/4))\times 100 \quad (3)$$

*where ML represents an absolute maximum length of the primary particles and A represents the projected area of the primary particles.*

*22. A toner for electrostatic image development, the toner comprising a toner particle and 5 to 300 external additive particles adhered to the surface of the toner particle that comprise a plurality of irreversibly coalesced primary par-*

*ticles and have a shape factor SF2 in a range of from 128 to 160, the shape factor SF2 being represented by the following formula (1):*

$$((\text{particle perimeter})^2/(\text{particle projected area}\times 4\times\pi))\times 100 \quad (1),$$

*wherein the number-average particle diameter D1 of the primary particles constituting the external additive particle and the number-average long axis diameter D2 of the external additive particle satisfies the relationship represented by the following formula (2):*

$$1.5\leq D2/D1\leq 15 \quad (2).$$

*23. The toner for electrostatic image development of claim 22, wherein the number-average long axis diameter of the external additive particle is from 0.06 μm to 1 μm.*

*24. The toner for electrostatic image development of claim 22, wherein the number-average long axis diameter of the external additive particle is from 0.02 μm to 0.50 μm.*

*25. The toner for electrostatic image development of claim 22, wherein the external additive particle is obtained by coalescing from 2 to 300 primary particles on a projected area.*

*26. The toner for electrostatic image development of claim 22, wherein the glass transition temperature of the toner particle is from 35° C. to 70° C.*

*27. A toner cartridge that is attachable to and detachable from an image forming apparatus provided with a development unit, and contains the toner for electrostatic image development of claim 22.*

*28. The toner for electrostatic image development of claim 22, wherein the irreversibly coalesced primary particles are organic particles, or are inorganic particles that are adhered to one another with a binder resin.*

*29. A method of forming an image, the method comprising:*

*forming an electrostatic latent image on the surface of a latent image holding member;*

*developing the electrostatic latent image with a developer comprising the toner for electrostatic image development of claim 22, thereby forming a toner image;*

*transferring the toner image formed on the latent image holding member to the surface of a recording medium, and*

*fixing the toner image on the surface of the recording medium.*

*30. The method of claim 29, wherein the irreversibly coalesced primary particles are organic particles, or are inorganic particles that are adhered to one another with a binder resin.*

*31. A method for producing the toner for electrostatic image development of claim 22, the method comprising:*

*producing external additive particles by irreversibly coalescing a plurality of primary particles, the shape factor SF2 of the external additive particles, represented by the following formula (1), being in the range of from 128 to 160; and*

*mixing the external additive particles with toner particles so that the external additive particles adhere to the surface of each of the toner particles:*

$$[(\text{particle perimeter})^2/(\text{particle projected area}\times 4\times\pi)]\times 100 \quad (1).$$

*32. The method of claim 31, wherein the primary particles are inorganic primary particles coalesced by adhering the plurality of inorganic primary particles to one another with a binder resin.*

*33. The method of claim 31, wherein the primary particles are organic primary particles.*

*34. The toner for electrostatic image development of claim 22, further comprising additional external additive particles adhered to the surface of the toner particle other than the external additive particles that comprise a plurality of irreversibly coalesced primary particles.*

*35. The toner for electrostatic image development of claim 22, further comprising re-dispersed primary particles adhered to the surface of the toner particle.*

*36. The toner for electrostatic image development of claim 22, further comprising up to 18% particles comprised of reversibly coalesced primary particles adhered to the surface of the toner particle based on a total number of particles comprised of coalesced primary particles adhered to the surface of the toner particle.*

*37. The toner for electrostatic image development of claim 22, wherein the individual primary particles have a shape factor SF1 in a range of from 100 to 130, the shape factor SF1 being represented by the following formula (3):*

$$SF1=((ML^2/A)\times(\pi/4))\times 100 \quad (3)$$

*where ML represents the absolute maximum length of the primary particles and A represents the projected area of the primary particles.*

*38. The toner for electrostatic image development of claim 13, wherein the inorganic primary particles are selected from the group consisting of silica, titanium oxide and cerium oxide.*

* * * * *